United States Patent Office 3,729,323
Patented Apr. 24, 1973

3,729,323
PROCESS FOR IMPROVING THE TEXTURE, RIGIDITY, AND COLOR OF FRIED POTATO PRODUCTS
Masahide Nonaka, Moraga, Earl Hautala, Richmond, and Merle L. Weaver, Martinez, Calif., assignors to the United States of America as represented by the Secretary of Agriculture
No Drawing. Filed July 19, 1971, Ser. No. 164,037
Int. Cl. A23b 7/04; A23l 1/12
U.S. Cl. 99—100 P          5 Claims

ABSTRACT OF THE DISCLOSURE

The texture, rigidity, and color of fried potato strips is vastly improved when their pre-fried precursors are prepared by (a) freezing the surface of the raw strip, (b) leaching the surface sugars with warm water, (c) parfrying the so-treated strip, and (d) refreezing said strip either superficially or totally.

---

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

The invention relates to the production of pre-fried potato products which ultimately are converted by the consumer into fried potato products such as French-fried potatoes, shoe-string potatoes, and the like. In particular, the invention has among its objects the provision of methods for preparing pre-fried potatoes which yield end products of enhanced texture, rigidity, and color.

In the following description the terms "fried potato product," "finished fries," etc. are used for convenience; obviously, the advantages of the invention cannot be realized until the pre-fried product is cooked, as by applying a finish-frying or baking operation. It is not meant to imply that the final cooking step necessarily forms any part of the invention which is concerned primarily with the manufacture of pre-fried potato products.

Further objects of the invention will be evident from the following description wherein parts and percentages are by weight unless otherwise specified. Texture here relates to the surface layer of the strip but also includes the center. Good quality fried potato strips have a thick, crisp surface layer and a mealy inner core. Rigidity concerns the ability of the finished fry to bend and is thus distinguished from texture. A thick, leathery surface can impart rigidity to a fry. It should be obvious that a crisp, rigid rather than a leathery, rigid finished fry is preferred. The terms "fat" and "oil" are used synonymously herein as designating an edible glyceride whether normally solid or liquid.

Most restaurants, including the large franchise chains, prefer to prepare their French-fried potatoes from the frozen or chilled pre-fried product rather than to go through the cumbersome procedure of preparing French fries from raw potatoes. Although these pre-fried products offer convenience and savings in labor costs, one problem which has beset the industry is that when the products are prepared for the table (either by oven heating or by deep-fat frying), they are unstable as to texture. Immediately after removal from the oven or deep-fat fryer, the potato strips have a desirable crisp texture, but as they cool they become limp and soggy. This problem is particularly acute in large restaurant operations: Guests who receive the first portions of each batch enjoy French fries of desirable crisp texture, whereas others who receive subsequent portions of the batches can only contemplate with dismay the soggy, limp strips on their plates.

Another problem to be considered is that conventional fried products have a high proportion of fat (derived from that used in the frying operation) and many consumers would prefer to have a product with a lower fat content. In conventional operations the fat content of the product is not subject to control to any substantial degree.

Another very important problem repeatedly confronting the manufacturer is the formation of products of acceptable and uniform color. If the potatoes are freshly harvested or have been stored after harvest at a temperature of about 50° F. or above, no complications will generally occur. Under such circumstances, the raw pieces can be readily fried to yield a product of acceptable color. However, when the potatoes have been kept at lower temperatures (that is, cold storage temperatures of about 40° F.) necessary for holding the tubers longer than about three months, complications set in. Potatoes held under such cold storage conditions tend to darken on frying to give products of very undesirable dark brown color, that is, products which are not marketable.

The primary object of the invention is to provide the means for obviating the problems outlined above. Basically, the objects of the invention are attained by applying the following operations after first subjecting the raw potatoes to the usual preliminary steps such as washing, peeling, and cutting into pieces. The pieces may be rinsed with water to remove surface particles but this is not critical.

STEP 1

The pieces of raw potato are contacted with a liquid refrigerant which is at a temperature below 0° F., preferably below minus 20° F. It is essential that a liquid refrigerant be used. Suitable for the purpose is liquid nitrogen which inherently exists at a temperature of about minus 320° F. One may also use any of the fluorocarbons which exist in the liquid state when cooled to the temperature selected for the treatment. Typical fluorocarbons which may be used in accordance with the invention are listed in the following table.

| Solvent | Formula | Boiling point °F. | °C. |
|---|---|---|---|
| Tetrafluoromethane | $CF_4$ | −198.4 | −128.0 |
| Trifluoromethane | $CHF_3$ | −115.7 | −82.1 |
| Trifluoromonochloromethane | $CClF_3$ | −114.6 | −81.4 |
| Hexafluoroethane | $CF_3-CF_3$ | −108.8 | −78.2 |
| Trifluoromonobromomethane | $CBr_2F_2$ | −72.0 | −57.8 |
| Difluoromonochloromethane | $CHClF_2$ | −41.4 | −40.8 |
| Pentafluoromonochloroethane | $CClF_2-CF_3$ | −37.7 | −38.7 |
| Difluorodichloromethane | $CCl_2F_2$ | −21.6 | −29.8 |
| 1,1-difluoroethane | $CH_3-CHF_2$ | −11.2 | −24.0 |
| Symmetrical tetrafluorodichloroethane | $CClF_2-CClF_2$ | 38.4 | 3.6 |
| Monofluorodichloromethane | $CHCl_2F$ | 48.1 | 8.9 |
| Monofluorotrichloromethane | $CCl_3F$ | 74.8 | 23.8 |
| Octafluorocyclobutane | (see structure) | 21.1 | −6.0 |

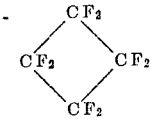

Particularly preferred is the use of dichlorodifluoromethane since this compound can be effectively used at about its boiling point (minus 21.6° F.) so that its temperature is easily maintained at a uniform level. The loss of the compound by vaporization is prevented by positioning a refrigerated coil above the vessel in which it is contained, whereby the vapors of dichlorodifluoromethane are condensed to the liquid form which drips back into the vessel.

The step of contacting the refrigerant with the potato pieces may be effectuated by dipping the pieces in a pool of the refrigerant, or by spraying the refrigerant on them. In any case, the time of contact is limited so that only the surface layers of the pieces become frozen. The contact should not be maintained long enough to cause the pieces to crack. The time required to achieve the desired end will vary depending on such factors as the solids content of the tubers, the temperature of the refrigerant, etc. In any particular case, the proper time can be determined by conducting pilot trials. In typical runs, we have attained good results by dipping potato strips in the cold liquid refrigerant for periods of about 3 to 30 seconds. A particular advantage accruing from the use of dichlorodifluoromethane at a temperature approximately equal to its boiling point (for example, minus 21.6° to minus 30° F.) is that the contact time need not be rigorously regulated. For example, if the contact time happens to be extended a few seconds past the time required to achieve surface freezing, cracking of the pieces rarely occurs.

STEP 2

After the contact with the refrigerant described above, the potato pieces are immediately leached with warm (about 70–150° F., preferably about 120–125° F.) water for a period of about 10 to 20 minutes. The leaching may be carried out, for example, by immersing the potato pieces in the warm water, or by spraying or flooding the warm water over the pieces.

Following the warm water leaching step, the potato pieces may be rinsed with cold (tap) water. This operation, however, has no critical effect and may be omitted.

STEP 3

Next, the potato pieces are par-fried in edible oil, typically at 356° F. for 0.5 to 3 minutes.

STEP 4

The par-fried pieces are then subjected to a second freezing step. Prior thereto, the pieces may be cooled to ambient temperature by standing in air or by application of a cool air stream. In the preferred practice of the invention, however, the par-fried pieces are directly subjected to the freezing step.

The freezing applied in this step may be either a surface freeze or a total freeze. Where the former is employed, the procedure described in Step 1 can be followed. However, it is not essential that this surface freeze be effected by the use of a liquid refrigerant; one may use a refrigerant in a gaseous state. As an example, the potato pieces may be subjected to a current of air at a temperature below 0° F. A convenient plan is to use a conventional freezer where the potato pieces are subjected to a blast of air at about minus 34° F., the time of treatment being limited to attain freezing of surface layers only.

In the event that the par-fried pieces are given a total freeze, this may be effectuated in any manner as conventional in freezing food products. A convenient plan is to use a blast freezer where the potato pieces are subjected to a high-velocity current of air cooled, for example, to about minus 34° F., and continuing the treatment until the product is completely frozen. Alternatively, the pieces are placed in a freezer compartment—for example, at minus 10° F.—of suitable size such as a commercial or industrial unit. It is to be emphasized that it is the frozen state which is important, not the means for effecting the same.

Following application of either type of freezing operation explained above, the products are ready to be transported to the restaurant, grocery, or ultimate consumer. During shipping and storage and until they are prepared for the table, the products are refrigerated, i.e., held either in a chilled state at cold storage temperatures (about 35–45° F.) or in a frozen state at temperatures below 32° F. The preparation of the products for the table merely requires finish-frying in hot edible oil or baking in a hot oven, as customary with conventional pre-fried potato products.

Where the product is to be kept in a chilled state, it is preferred that the second freezing (Step 4, above) be a surface-localized freeze. On the other hand, where the product is to be kept in the frozen state, it is preferred that the second freezing (Step 4, above) be a total freeze.

The products stored in a chilled state have a shelf-life of about 7 to 10 days. Preservation in this condition is most suitable for sale to restaurant chains which specialize in short orders (e.g., hamburgers) with French fries as their primary side dish, so that the short shelf-life of the product is no disadvantage. There is, of course, an advantage in the chilled product in that its preparation for the table requires less time than with frozen products.

The products when held in the frozen state have a shelf-life of many months so that products so preserved are useful for sale to groceries and other organizations where there may be a long delay before the products are consumed.

Referring to Steps 1 and 2 of the invention disclosed above, it may be noted that the sequence of these steps may be reversed. Thus, in an alternative embodiment of the invention, the potato strips are first leached in warm water (Step 2) and then they are subjected to the surface-localized freeze (Step 1). Further operations are as previously described.

A primary advantage of the invention is that it provides pre-fried potatoes which yield end-products of excellent texture, rigidly, and color. Indeed, products of such desirable attributes can be prepared from raw stock—such as potatoes which had been held in cold storage—which normally be considered unfit for preparing high quality potato products.

Another advantage of the invention is that the fried potato producer is now able to regulate the degree of texture and rigidity of his product. This is done simply by controlling the time and temperature in each of the steps outlined above. For example, a greater degree of crispiness is obtained if the time of the initial surface freeze is 13 seconds rather than 5 seconds and the temperature of the refrigerant is −20° F. rather than 0° F. Leaching with warm water (Step 2) is a most critical step; maximum crispiness and rigidity are obtained after 20 minutes at a water temperature of 125° F. Complete control can be obtained in the following way: The surface of the strip is frozen for 9 seconds and then the strip is leached with water at 125° F. for 15 minutes. By varying the par-fry time from 0.5 to 3 minutes and temperature from 300 to 360° F., one can reproducibly prepare pre-fried strips which, upon finish cooking, have the desired level of crispness and rigidity. However, it is essential that there be two freezes, separated by a par-fry. If any of the steps are omitted, crispness and rigidity drastically decrease. It should be noted that the increased crispness and rigidity are sustained for long periods of time so that the fried product provided by the invention has a distinct advantage over present commercially produced fries.

The invention also supplies a fried potato strip with an excellent inner texture. Often, in commercial operations the potato strips are further cooked for 3 minutes at 180° F. after a leaching step to impart a desired mealy internal texture in the final product. As a result of the invention, this step is completely unnecessary because the mealiness of the finished fries is unsurpassed in any conventionally produced potato strip.

A particular advantage of the invention is the decrease in fat content of the finished fry. This results because of the extra surface layers which are affected during the operation of the invention. These thickened surface layers prevent the absorption of the oil used in the cooking process by as much as 35%; hence, less oil is present in the product. Besides being an advantage to the consumer by providing a low-fat fried potato strip, the invention also offers an economical advantage to the producer. Since less oil is absorbed, the amount of oil needed to replenish the cooking bath will be reduced. It should be emphasized that the amount spent for cooking oil is one of the major expeditures incurred by the producer of fried potato products.

Another advantage of this thickened surface layer is that the pre-fried strips can be baked to complete the cooking process. Said baked fries are superior to baked fries prepared from conventionally produced pre-fried strips in that they are crisp and rigid and taste like a finish-fried product. Since most home consumers do not own a deep-fat fryer, they will very much appreciate a good quality baked French fry.

Still another advantage of the thickened surface layers is that, if the finished fries are not consumed immediately and get cold, they can be reheated with no loss of flavor, crispness, rigidity, or color. Thus, restaurateurs can manipulate the preparation of fries so that a large quantity can be processed before an anticipated rush. During the rush the fries can be quickly heated so that each customer receives high-quality fried potato strips.

Some of the steps of the present invention are similar to those described in the copending application of Merle L. Weaver and Earl Hautala, Ser. No. 58,186, filed July 24, 1970, now Pat. 3,669,685, which concerns the improvement of color in fried potato products. It is to be emphasized that the processes described in Ser. No. 58,186 do not produce the benefits of the present invention, namely, enhanced texture and rigidity. On the other hand, the color improvement of Ser. No. 48,186 is attained by the process of the present invention.

The differences between the present invention and that of the aforesaid prior application are further explained as follows: In accordance with the present process there are two freezing steps separated by a frying step. These operations are critical to achieve a high degree of crispness and rigidity and, moreover, such results cannot be achieved by the process of Ser. No. 58,186 wherein a single freezing step is employed. Another important item is that the warm-water leaching step in accordance with the present invention is conducted for 10 to 20 minutes. This step is also vital to attaining a high degree of crispness and rigidity. Such results cannot be attained with the process of Ser. No. 58,186 wherein the leaching is conducted for a much shorter period. In sum, the physical operations applied in accordance with the present invention are different from those of Ser. No. 58,186, and yield results of enhanced crispness and rigidity unattainable by the prior process.

EXAMPLES

The invention is further demonstrated by the following illustrative examples. Some of the examples constitute no part of the present invention and are provided only for purposes of comparison.

Surface crispness was determined by biting the fry and grading on the basis of the following scale:

0 = no crispness, soggy.
1 = crispness typical of standard commercial frozen fries.
2 = thicker surface layer and more crispness than commercial fries.
3 = optimum thickness and maximum crispness of surface layer attainable by the invention.

Rigidity test: Equipment was set up comprising a platform and clamping means so that a single potato strip could be held on the edge of the platform with 3½" of its length projecting horizontally into space. A protractor was arranged so that the angle of deflection (sag or droop) of the strip could be measured. With this test a small angle of deflection indicates a rigid strip; a large angle indicates a limp one.

EXAMPLE 1

Comparison of finished fries prepared by several methods

Method 1 (invention).—The potato strips were surface frozen by dipping in difluorodichloromethane at —40° F. for 13 seconds, and then dipped in water at 125° F. for 20 minutes. After rinsing in cold tap water at 65–70° F. for 1 minute and par-frying for 1.5 minutes in oil at 356° F., the strips were subjected to a 10-minute freeze in an air blast freezer at —34° F. To prepare them for the table, the frozen strips were finish-fried in oil at 356° F. for 3.5 minutes. The resulting products were tested for crispness and rigidity immediately after finish frying and after standing in air for various times (as indicated below).

Method 2 (invention).—Same as method 1 except that the potato strips were first dipped in water at 150° F. for 20 minutes and then surface frozen by dipping in difluorodichloromethane at —40° F. for 13 seconds.

Method 3.—Same as method 1 except that the initial (surface) freeze was omitted.

Method 4.—Same as method 1 except that the warm-water (125° F.) leach was conducted for only 1 minute.

Method 5.—Same as method 1 except that the second freeze was not used.

The results are summarized below.

| Method | Time after finish-fry (min.) | Crispness | Rigidity, degrees |
|---|---|---|---|
| 1 | 0 | 3 | 0 to 1. |
|   | 5 | 3 | 0 to 1. |
|   | 10 | 3 | 0 to 1. |
| 2 | 0 | 3 | 0 to 1. |
|   | 5 | 3 | 0 to 1. |
|   | 10 | 3 | 0 to 1. |
| 3 | 0 | 1 | 0 to 1. |
|   | 5 | 0 | 30 to 40. |
|   | 10 | 0 | 30 to 40. |
| 4 | 0 | 1 | 0 to 1. |
|   | 5 | 0 | 30 to 40. |
|   | 10 | 0 | 30 to 40. |
| 5 | 0 | 1 | 0 to 1. |
|   | 5 | 0 | 30 to 40. |
|   | 10 | 0 | 30 to 40. |

EXAMPLE 2

Importance of time and temperature of leaching with warm water on the crispness and rigidity of finished fries Treatment 1.—The potato strips were surface frozen by dipping in difluorodichloromethane at —21.6° F. for 13 seconds and then leached for 20 minutes in water at 125° F. Afterwards, the pieces were par-fried at 356° F. for 1 minute and then frozen with an air blast freezer (—34° F.) for 15 minutes. Finally, to prepare them for the table, the strips were finish-fried at 356° F. for 3.5 minutes.

Treatment 2.—The potato strips were dipped in water at 140° F. for 15 minutes and then their surfaces were frozen by dipping in difluorodichloromethane at —21.6 F. for 13 seconds. After par-frying in oil at 356° F. for 1.5 minutes, the strips were frozen with an air blast at —34° F. for 10 minutes. To prepare them for the table, the frozen strips were fried at 356° F. for 4 minutes.

Treatment 3.—Same as treatment 1 except that the leaching time was 10 minutes.

Treatment 4.—Same as treatment 1 except that the leaching time was 5 minutes.

The results are summarized below

| Treatment | Time after finish-fry (min.) | Crispness | Rigidity, degrees |
|---|---|---|---|
| 1 | 0 | 3 | 0 to 1. |
|   | 5 | 3 | 0 to 1. |
|   | 10 | 3 | 0 to 1. |
| 2 | 0 | 3 | 0 to 1. |
|   | 30 | 3 | 0 to 1. |
| 3 | 0 | 3 | 0 to 1. |
|   | 5 | 2 | 0 to 1. |
|   | 10 | 2 | 0 to 1. |
| 4 | 0 | 1 | 0 to 1. |
|   | 5 | 0 | 30 to 40. |
|   | 10 | 0 | 30 to 40. |

EXAMPLE 3

Effect of holding twice-frozen potato strips at refrigerator temperatures before finish-frying Treatment 1.—The potato strips were surface frozen by dipping in difluorodichloromethane at −40° F. for 13 seconds and then dipped in water at 124° F. for 20 minutes. After par-frying for 2 minutes at 356° F., the strips were again surface-frozen by subjection to an air blast freezer at −34° F. for 7 minutes. These strips were held at 34° F. in a refrigerator for 6 days. To prepare them for the table, the frozen strips were finish-fried in oil at 356° F. for 3.5 minutes.

Treatment 2.—Same as treatment 1 except that the second freeze was a total freeze, effected by subjection of the strips to an air blast freezer at −34° F. for 15 minutes. The so-treated strips were held frozen at −10° F. for 18 days and then held at 34° F. in the refrigerator for 8 days.

The results are summarized below.

| Treatment | Time after finish-fry (min.) | Crispness | Rigidity, degrees |
|---|---|---|---|
| 1 (surface freeze) | 0 | 3 | 0 to 1. |
|   | 5 | 3 | 0 to 1. |
|   | 10 | 3 | 0 to 1. |
| 2 (solid freeze) | 0 | 3 | 0 to 1. |
|   | 5 | 3 | 0 to 1. |
|   | 10 | 3 | 0 to 1. |

EXAMPLE 4

Reduction in fat content of par- and finished-fries

The fat contents of a par- and a finished-fry were determined for a commercial potato strip and a strip prepared according to the procedure outlined in Example 1, method 1. In each case the product was freeze-dried and weighed, and the fat was extracted by standard procedures.

The results are tabulated below.

| Product | Fat content, percent (dry basis) | |
|---|---|---|
|  | Par | Finished |
| Example 1, Method 1 | 10.6 | 13.7 |
| Commercial | 15.6 | 17.6 |

Having thus described our invention, we claim:

1. A process for preparing fried potato products of enhanced texture and rigidity which comprises:
  (a) contacting pieces of raw potato with a liquid refrigerant maintained at a temperature below 0° F. for a limited period of time so that essentially only surface layers of the pieces are frozen,
  (b) leaching the so-treated potato pieces with warm water, at about 120–150° F., for a period of about 10 to 20 minutes,
  (c) frying the pieces in hot edible oil, at about 300–360° F., and
  (d) freezing the pieces to at least a superficial extent.

2. The process of claim 1 wherein steps (a) and (b) are applied in reverse order.

3. The process of claim 1 wherein, in step (d) the freezing is limited so that essentially only surface layers of the pieces are frozen.

4. The process of claim 1 wherein, in step (d) the freezing is intensive enough to attain total freezing of the pieces.

5. The process of claim 1 wherein, in step (c), the pieces are par-fried in edible oil at about 356° F. for a period of about 0.5 to 3 minutes.

References Cited

UNITED STATES PATENTS

| | | | | |
|---|---|---|---|---|
| 3,397,993 | 8/1968 | Strong | 99—193 |
| 3,660,113 | 5/1972 | Ng | 99—193 |
| 3,669,685 | 6/1972 | Weaver | 99—100 |

NORMAN YUDKOFF, Primary Examiner

M. G. MULLEN, Assistant Examiner

U.S. Cl. X.R.

99—193, 198